United States Patent [19]

Hull

[11] Patent Number: 5,625,146

[45] Date of Patent: Apr. 29, 1997

[54] METHOD AND SYSTEM FOR DETERMINING AXIAL MODULUS

[75] Inventor: Andrew J. Hull, New London, Conn.

[73] Assignee: The United States of America as represented by the Secretary of the Navy, Washington, D.C.

[21] Appl. No.: 587,766

[22] Filed: Dec. 18, 1995

[51] Int. Cl.[6] .................... G01N 3/00; G01H 13/00
[52] U.S. Cl. .................... 73/574; 73/579; 73/581
[58] Field of Search .................. 73/649, 574, 575, 73/584, 602, 581, 582, 658, 659, 579; 364/505, 506

[56] References Cited

U.S. PATENT DOCUMENTS

| | | | |
|---|---|---|---|
| 4,418,573 | 12/1983 | Madigosky et al. | 73/574 |
| 5,363,701 | 11/1994 | Lee et al. | 73/574 |
| 5,365,457 | 11/1994 | Madigosky | 73/574 |
| 5,533,399 | 7/1996 | Gibson et al. | 73/579 |

*Primary Examiner*—Hezron E. Williams
*Assistant Examiner*—Helen C. Kwok
*Attorney, Agent, or Firm*—Michael J. McGowan; James M. Kasischke; Prithvi C. Lall

[57] ABSTRACT

A method is provided for determining the axial modulus of an elongate material sample of mass density $\rho$ and length L. The first end of the sample is driven longitudinally at a frequency of excitation $\omega$. The second end of the sample opposite the first end may or may not be under tension. At the frequency of excitation $\omega$, the longitudinal displacement and longitudinal force at the first and second ends of the sample are determined. The axial modulus is calculated for any frequency as a function of mass density $\rho$, length L, frequency of excitation $\omega$, and longitudinal displacement and longitudinal force at the first and second ends.

7 Claims, 2 Drawing Sheets

METHOD AND SYSTEM FOR DETERMINING AXIAL MODULUS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to methods for measuring material characteristics, and more particularly to a method and system for determining the elastic modulus of a material along the longitudinal axis thereof.

(2) Description of the Prior Art

To predict the dynamic response of a structure, it is necessary to measure the stiffness and loss properties of materials one important property is the elastic modulus which is a complex value having a real part corresponding to energy transmission and an imaginary part corresponding to energy attenuation. Resonant techniques for measuring stiffness and loss have been used by researchers for many years and are based on measuring the eigenvalues of a structure and comparing them to eigenvalues of a model of the same structure. The structure must have well-defined eigenvalues and eigenvectors for the method to be successful. However, structural materials that are placed under tension (with masses or ropes) do not have closed-form eigenvectors, and their eigenvalues must be calculated with a transcendental equation. Additionally, this test only allows measurements at resonances.

Some material testing machines are designed to excite pieces of materials in a manner that allows investigation of stiffness and loss. However, the typically small test samples cannot be subjected to significant tensile forces because of their size. Another approach for measuring stiffness and loss parameters compares analytical models to measured frequency response functions. However, most of these methods tend to be computationally intensive, and the fitting routines do not always converge to the correct answer, especially when more than one unknown parameter of the model must be estimated.

More recently, methods have been developed to determine the elastic modulus of a material. Some methods use strain gauges which can be physically intrusive when measuring the properties of soft materials. Another method of measuring the elastic modulus is presented in U.S. Pat. No. 4,418,573. The method of the '573 patent utilizes system phase angle relations to determine where, in frequency, a measurement can be made. However, this approach does not provide measurements at all frequencies since measurements are only possible at the occurrence of zero phase angles—a situation that does not occur at all frequencies.

SUMMARY OF THE INVENTION

Accordingly, it is an object of the present invention to provide a method for determining the elastic modulus of a material.

Another object of the present invention is to provide a method for determining the elastic modulus of a long material in the axial direction thereof for any frequency.

Still another object of the present invention is to provide a method for determining the elastic modulus of a long material under tension in the axial direction thereof for any frequency.

Other objects and advantages of the present invention will become more obvious hereinafter in the specification and drawings.

In accordance with the present invention, a method is provided for determining the axial modulus E of an elongate sample of a material. The sample has a mass density $\rho$ and a length L that is considerably greater than its lateral dimension. The first end of the sample is driven longitudinally at a frequency of excitation $\omega$. While being driven longitudinally, longitudinal acceleration at the first and second ends of the sample, and longitudinal force experienced at the first and second ends of the sample, are determined as a function of time. The time measurements are converted to the frequency domain resulting in frequency domain data for longitudinal acceleration of the sample at either end and longitudinal force experienced at either end of the sample. A ratio $R_1$ is generated and is equal the longitudinal acceleration of the first end divided by the longitudinal acceleration of the second end. This ratio is identical to the ratio of longitudinal displacement of the first end divided by longitudinal displacement of the second end. A ratio $R_2$ is generated and is equal to the longitudinal force experienced at the first end divided by the longitudinal force experienced at the second end. A real portion $k_R$ and imaginary portion $K_i$ of extensional wave number k is calculated.

The axial modulus E is calculated from the mass density, $\rho_j$ the excitation frequency, $\omega_j$ and the extensional wave number, k.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT

Figure 1:
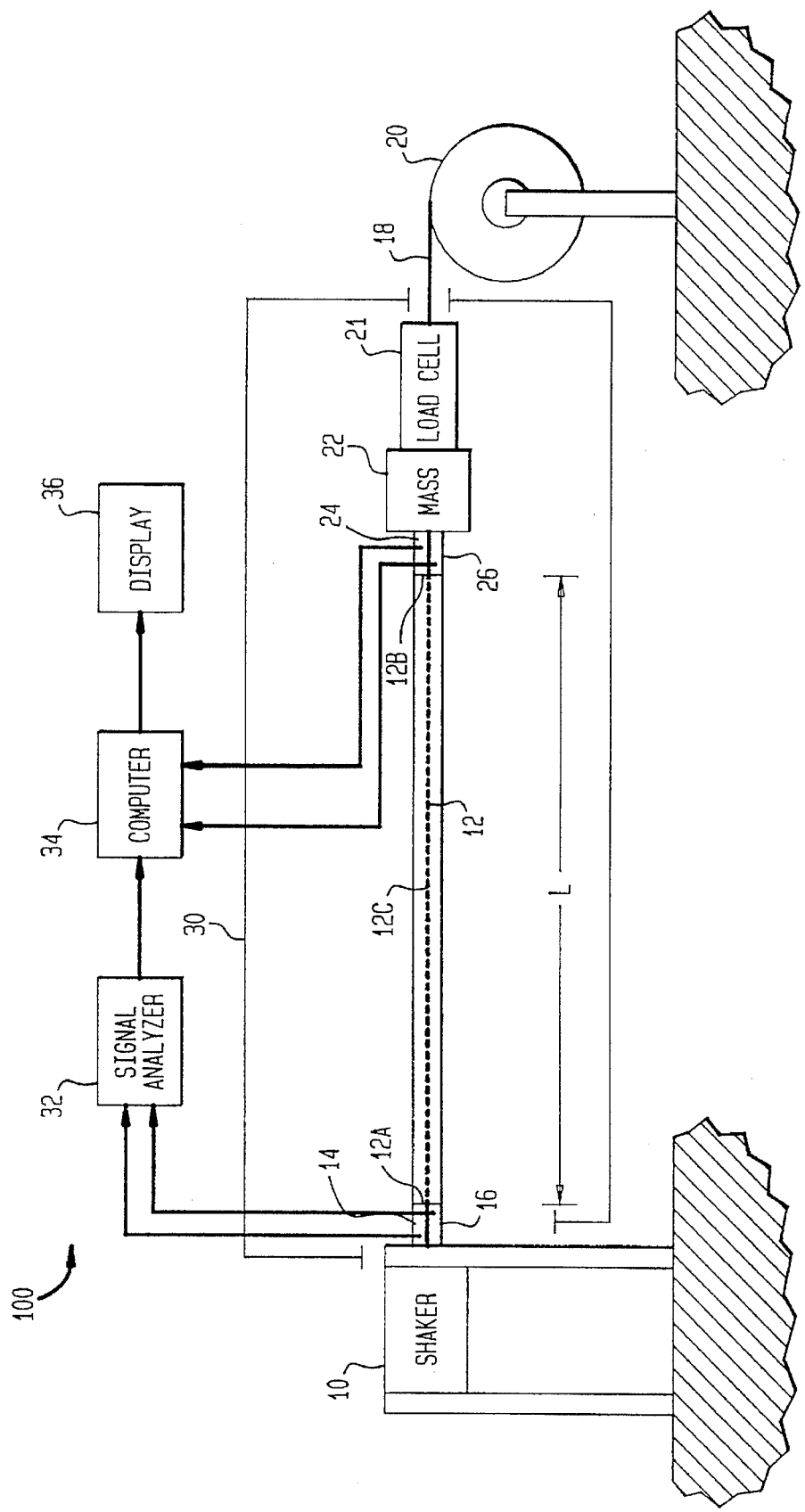
FIG. 1 is a schematic illustration of an apparatus for carrying out the method of determining the axial modulus of a material according to the present invention.

Referring now to the drawings, and more particularly to FIG. 1, an apparatus is illustrated for carrying out the method of the present invention and is referenced generally by numeral 100. The material under test is an elongate bar 12 having length L that is considerably greater, i.e., 10 times or more, than the lateral dimension, e.g., diameter, width, etc., of bar 12. Hydraulic shaker 10 is coupled to forward end 12A of bar 12 through force transducer 16 which is mounted on end 12A. Force transducer 16 measures the force experienced at end 12A. Accelerometer 14 is mounted on bar 12 near end 12A to measure the acceleration of end 12A. Shaker 10 provides a sinusoidal force to bar 12 along its longitudinal axis 12C. At the opposite end 12B of bar 12, accelerometer 24 and force transducer 26 are mounted thereto for measuring the acceleration of end 12B and the force experienced at end 12B, respectively.

Although apparatus 100 and the method of the present invention will be described for bar 12 under tension, it is not a requirement of the present invention that bar 12 be subjected to a tensile load, i.e., end 12B can experience zero tension. Bar 12 is placed in tension by means of cable 18 extending from tension drum 20 which can adjust the cable and bar's tension. Cable 18 is attached to end 12B through a mass 22 and force transducer 26. Mass 22 is optionally attached between end 12B and rope 18 to increase the force levels measured by force transducer 26 thereby minimizing noise effects. Load cell 21 can be placed between mass 22 and cable 18 to measure the amount of tension applied to bar 12. Heating-air conditioning duct 30 can surround bar to create a controlled-temperature test environment.

As will be explained in greater detail below, the outputs from each of accelerometers 14, 24 and force transducers 16, 26 are fed through signal analyzer 32 where measurements taken in the time domain are converted to the frequency domain via a Fourier transform. The outputs of signal analyzer 32 are processed by computer 34 (in the manner to be explained below) and displayed on display 36 which can be a CRT screen, printer/plotter, etc.

The system model used in the present invention is based on a longitudinal bar whose governing differential equation is expressed in the spatial domain as $$\frac{d^2U(x)}{dx^2} + k^2U(x) = 0 \qquad (1)$$

where $U(x)$ is the Fourier transform of the axial displacement of bar 12 along axis 12C, x is the spatial location in meters and k is the complex extensional wave number of the bar in radians/meter. The extensional wave number k is equal to $$k = \omega/c \qquad (2)$$

where $\omega$ is the frequency of excitation in radians/second and c is the longitudinal wave speed of the bar in meters/second and is defined as $$c = \sqrt{\frac{E}{\rho}} \qquad (3)$$

where E is the elastic modulus along axis 12C, or the axial modulus (in Newtons/meter$^2$) as it will be referred to hereinafter, and $\rho$ is the density of bar 12 in kilograms/meter$^3$. The energy attenuation in bar 12 is defined with a structural damping law, and therefore modulus E and wave speed c are complex numbers. The real parts of wave c and modulus E correspond to energy transmission and the imaginary parts correspond to energy attenuation.

Combining equations (2) and (3), and solving for modulus E results in $$E = \frac{\rho\omega^2}{k^2} = \frac{\rho\omega^2}{(k_R + ik_I)^2} \qquad (4)$$

where $k_R$ is the real part of extensional wave number k, i is the square root of $-1$, and $k_I$ is the imaginary part of extensional wave number k.

The solution to equation (1) is $$U(x) = Ge^{ikx} + He^{-ikx} \qquad (5)$$

where G and H are coefficients determined by the boundary conditions at the ends of bar 12. Using the present invention, it is not necessary to know these boundary conditions to determine the axial modulus E of bar 12. The Fourier transform of the force at position x in bar 12 is $$F(x) = AE\frac{dU(x)}{dx} = AEik(Ge^{ikx} - He^{-ikx}) \qquad (6)$$

where A is the cross-sectional area of bar 12 in meters$^2$. The inversion of equations (5) and (6) at ends 12A and 12B will allow for a measurement of the unknown axial modulus E.

The present invention uses the time series data output from accelerometers 14, 24 and force transducers 16, 26 to determine $k_R$ and $k_I$ by forming a transfer function between accelerometers 14, 24 and a transfer function between force transducers 16, 26. More specifically, the two transfer functions are the displacement of end 12A divided by the displacement of end 12B, and the force experienced at end 12A divided by the force experienced at end 12B. As mentioned above, signal analyzer 32 performs a Fourier transform on the time series data outputs. The resulting Fourier transform outputs of signal analyzer 32 are:

U(0)=the displacement of end 12A;

U(L)=the displacement of end 12B;

F(0)=the force experienced at end 12A; and

F(L)=the force experienced at end 12B.

The theoretical form of the transfer functions can be written using equations (5) and (6) as $$\frac{U(0)}{U(L)} = \frac{G+H}{Ge^{ikL} + He^{-ikL}} = R_1 \qquad (7)$$

and $$\frac{F(0)}{F(L)} = \frac{G-H}{Ge^{ikL} - He^{-ikL}} = R_2 \qquad (8)$$

where L is the length of bar 12 in meters and $R_1$ and $R_2$ are transfer function data from apparatus 100. Equation (7) can be rewritten as $$\frac{H}{G} = -\left[\frac{R_1e^{ikL} - 1}{R_1^{-ikL} - 1}\right] \qquad (9)$$

and inserted into equation (8) yielding $$\cos(kL) = \frac{R_2R_1 + 1}{R_2 + R_1} = \phi \qquad (10)$$

where $\phi$ is a complex number. Using an angle-sum relationship on the complex cosine term in equation (10) and separating the equation into real and imaginary parts yields $$\cosh(k_IL) = \frac{\phi_R}{\cos(k_RL)} \qquad (11)$$

and $$\sinh(k_IL) = \frac{-\phi_I}{\sin(k_RL)} \qquad (12)$$

where the subscript "R" denotes the real value and the subscript "I" denotes the imaginary value of the corresponding complex number.

Equation (12) is squared and subtracted from the square of equation (11) yielding $$[\cosh(k_IL)]^2 - [\sinh(k_IL)]^2 = \frac{\phi_R^2}{[\cos(k_RL)]^2} - \frac{\phi_I^2}{[\sin(k_RL)]^2} = 1 \qquad (13)$$

Equation (13) can be simplified using trigonometric power relationships to $$\cos(2k_R L) = \phi_R^2 + \qquad (14)$$

$$\phi_I^2 - \sqrt{(\phi_R^2 + \phi_I^2)^2 - (2\phi_R^2 - 2\phi_I^2 - 1)} = s$$

The real part $k_R$ of k in equation 14 is solved for by $$k_R = \frac{1}{2L} \text{Arccos}(s) + \frac{n\pi}{2L} \qquad (15)$$

for even values of n, and $$k_R = \frac{1}{2L} \text{Arccos}(-s) + \frac{n\pi}{2L} \qquad (16)$$

for odd values of n. The "Arccos" designation denotes the principal value of the inverse cosine function. Since s is a cosine function (with respect to frequency), the value of n is determined from the function s. More specifically, n is 0 at zero frequency and n is incremented by 1 each time the cosine function s passes through $\pi$ radians.

The imaginary part $k_I$ of k is determined by adding equations (11) and (12) together resulting in $$k_I = \frac{1}{L} \log_e \left[ \frac{\phi_R}{\cos(k_R L)} - \frac{\phi_I}{\sin(k_R L)} \right] \qquad (17)$$

With the real and imaginary parts of the wave number k known, the complex-valued axial modulus of elasticity E can be determined at each frequency using equation (4). Thus, the axial modulus E has been measured without knowing the boundary conditions at x=0 and x=L, i.e., at ends 12A and 12B.

EXAMPLE

An experiment was conducted to validate the method of the present invention. A polyurethane bar with longitudinal polyester stiffeners was placed in tension using an apparatus as shown in FIG. 1. The bar had a density of 1100 kg/m³ and a cross-sectional area of $2.63 \times 10^4$ m². It was tested under two different tensions: 890N (low tension) and 3560N (high tension). The stressed length of the bar was 36.4 m for the low tension measurement and 37.3 m for the high tension measurement. The point mass had a weight of 13.6 kg. The data from the force transducers and accelerometers were passed to a signal analyzer such as an HP3562 dynamic signal analyzer. The analyzer converts the raw data from the time domain to the frequency domain. The test was run with a frequency range between 4 and 100 Hz. The data were collected with a logarithmic weight in frequency. However, for clarity, the data are displayed with a linear frequency scale. The hydraulic shaker used was a Zonic Corporation model 1215-10-T-ZSP86. The accelerometers were PCB Piezotronics model 348A and the force transducers were PCB Piezotronics model 233A. The load cell was a Lebow model 31/3 and the winch attached to the tension drum was Cordem Corporation model 1215-RMO.

Figure 2A:
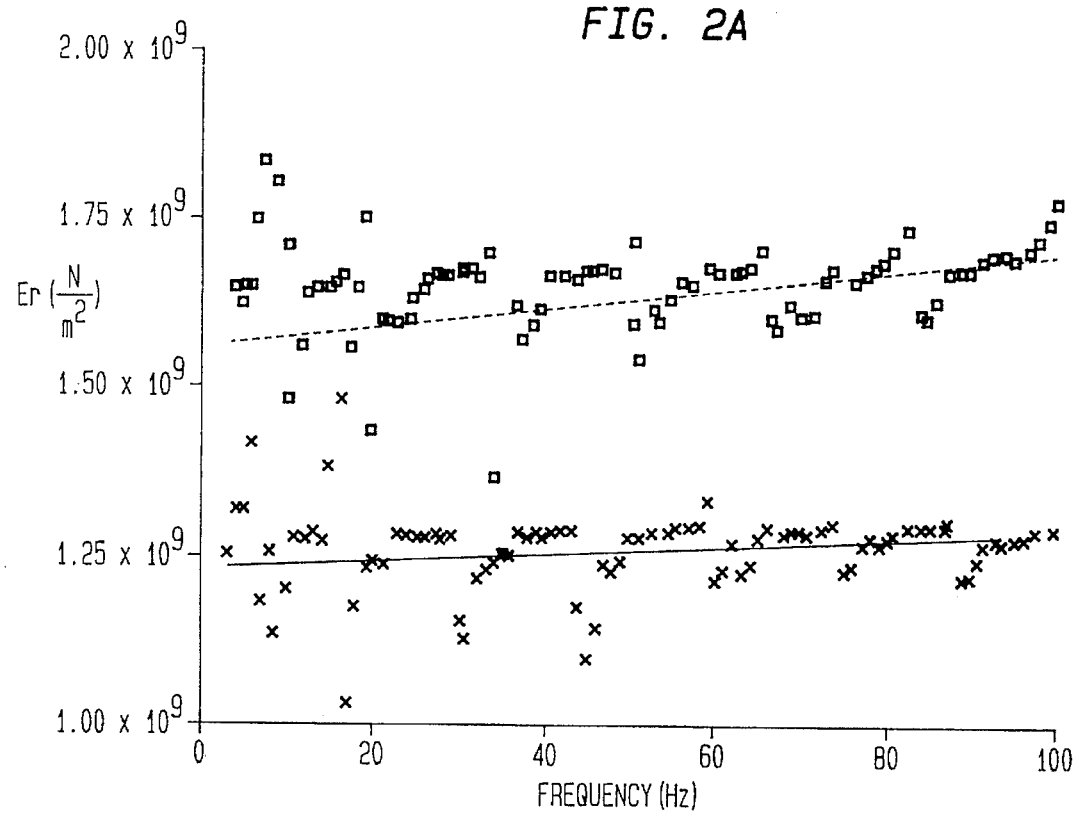
FIG. 2A is a graph illustrating the real part of the axial modulus for an elongate sample material as determined in accordance with the present invention.
Figure 2B:
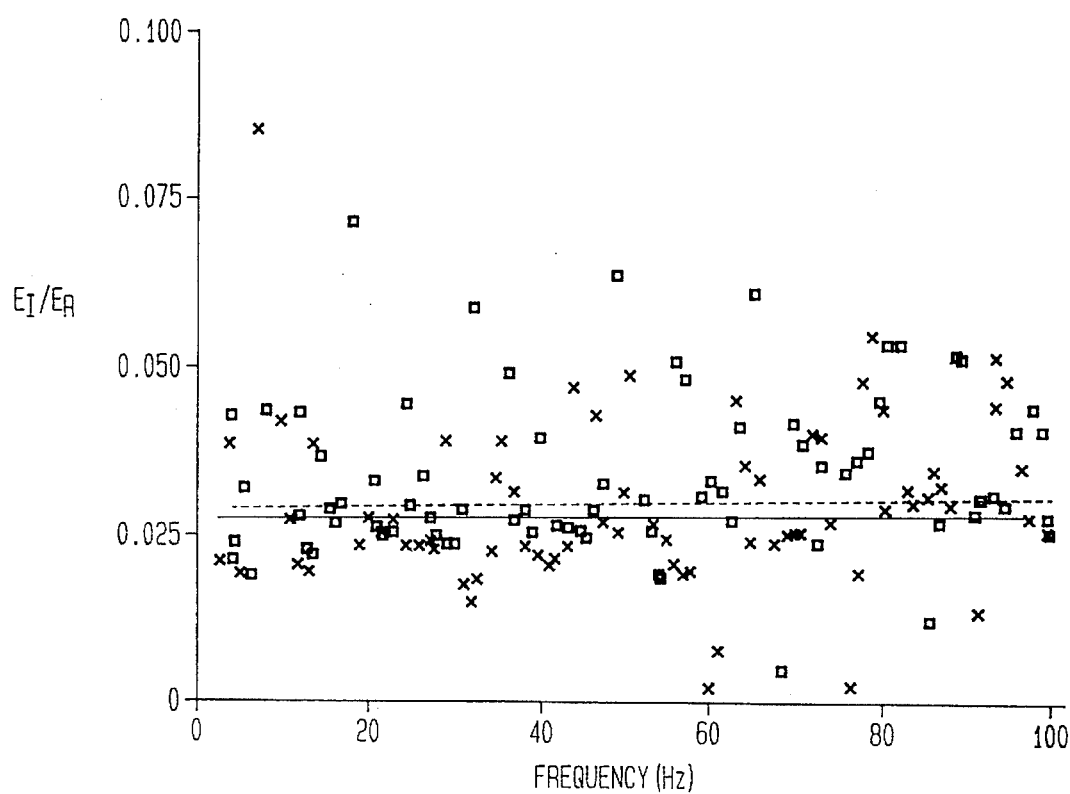
FIG. 2B is a graph illustrating the loss factor for the elongate sample material.

Equations (7)–(17) were applied to the Fourier transform data, and the resulting axial modulus of the material was found. FIGS. 2A and 2B are plots of the axial modulus versus frequency. FIG. 2A is the real part of E and FIG. 2B is the loss factor ($E_I/E_R$). The low tension data are shown with X's and the corresponding ordinary least square (OLS) straight-line fit is shown with the solid line. The high tension data are shown with boxes and the corresponding OLS straight-line fit is shown with a dashed line. The data points at resonance that are yielding extremely large and small values of the modulus were not used in computing the OLS straight-line fit. Although a straight-line was fit to the extracted modulus for this case, it is not necessary to use a linear estimate of the modulus. For some materials, it is likely that a polynomial fit to the modulus will produce more accurate results.

The advantages of the present invention are numerous. The axial modulus of a tensioned or untensioned bar can be calculated for any frequency from two transfer functions: the forward displacement of the bar divided by the aft displacement of the bar and the force experienced by the forward end of the bar divided by the force experienced by the aft end of the bar. The method yields a value for the modulus at every frequency for which data are collected. The frequency domain values of the modulus can be fit with a curve, and the model can be recalculated with this estimate of the modulus.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for determining the axial modulus of a material, comprising the steps of:

selecting an elongate sample of the material having a mass density $\rho$ and a length L that is considerably greater than a lateral dimension of said elongate sample;

driving a first end of said elongate sample longitudinally at a frequency of excitation $\omega$;

determining, at said frequency of excitation $\omega$, longitudinal displacement of said elongate sample at said first end and a second end opposite said first end; and determining, at said frequency of excitation $\omega$, longitudinal force experienced at said first end and said second end, wherein said axial modulus is calculated as a function of said mass density $\rho$, said length L, said frequency of excitation $\omega$, said longitudinal displacement of said elongate sample at said first end and said second end, and said longitudinal force experienced at said first end and said second end.

2. A method according to claim 1, wherein said steps of determining longitudinal displacement and longitudinal force comprise the steps of:

measuring, as a function of time, longitudinal acceleration of said first end and longitudinal acceleration of said second end of said elongate sample that is opposite said first end;

measuring, as a function of time, longitudinal force experienced at said first end and longitudinal force experienced at said second end;

performing a Fourier transform on each of said longitudinal acceleration of said first end, said longitudinal acceleration of said second end, said longitudinal force experienced at said first end, and said longitudinal force experienced at a second end;

generating a ratio $R_1$ equal to said Fourier transform of said longitudinal acceleration of said first end to said Fourier transform of said longitudinal acceleration of said second end;

generating a ratio $R_2$ equal to said Fourier transform of said longitudinal force experienced at said first end to said Fourier transform of said longitudinal force experienced at said second end;

calculating a real portion $k_R$ of extensional wave number k according to the formula $$k_R = \frac{1}{2L} \operatorname{Arccos}(s) + \frac{n\pi}{2L}$$

when n is even, and according to the formula $$k_R = \frac{1}{2L} \operatorname{Arccos}(-s) + \frac{n\pi}{2L}$$

when n is odd, wherein Arccos designates the principal value of the inverse cosine function, s is a cosine function defined according to the formula $$s = \phi_R{}^2 + \phi_I{}^2 - \sqrt{(\phi_R{}^2 + \phi_I{}^2)^2 - (2\phi_R{}^2 - 2\phi_I{}^2 - 1)}$$

where $\phi_R$ is the real portion and $\phi_I$ is the imaginary portion of a relationship $\phi$ defined as $$\phi = \phi_R + i\phi_I = \frac{R_2 R_1 + 1}{R_2 + R_1},$$

and where n is 0 at zero frequency and n is a non-negative integer incremented by 1 each time said cosine function s passes through $\pi$ radians;

calculating an imaginary portion $k_I$ of said extensional wave number k according to the formula $$k_I = \frac{1}{L} \log_e \left[ \frac{\phi_R}{\cos(k_R L)} - \frac{\phi_I}{\sin(k_R L)} \right];$$

and calculating said axial modulus E according to the formula $$E = \frac{\rho \omega^2}{(k_R + ik_I)^2}.$$

3. A method according to claim 1 wherein said length L is selected to be at least ten times said lateral dimension.

4. A method according to claim 1 further comprising the step of applying tension to said second end during said step of driving.

5. A method for determining the axial modulus E of a material, comprising the steps of:

selecting an elongate sample of the material having a mass density $\rho$ and a length L that is considerably greater than a lateral dimension of said elongate sample;

securing a first accelerometer to a first end of said elongate sample and a second accelerometer to a second end of said elongate sample opposite said first end;

securing a first force transducer to said first end and a second force transducer to said second end;

shaking said elongate sample longitudinally at a frequency of excitation $\omega$;

converting outputs from said first accelerometer, said second accelerometer, said first force transducer, and said second force transducer to a frequency domain, wherein the output from said first accelerometer converted to the frequency domain is indicative of longitudinal displacement of said elongate sample at said first end, the output from said second accelerometer converted to the frequency domain is indicative of longitudinal displacement of said elongate sample at said second end, the output from said first force transducer converted to the frequency domain is indicative of longitudinal force experienced at said first end, and the output from said second force transducer converted to the frequency domain is indicative of longitudinal force experienced at said second end;

generating a ratio $R_1$ equal to said longitudinal displacement of said first end divided by said longitudinal displacement of said second end;

generating a ratio $R_2$ equal to said longitudinal force experienced at said first end divided by said longitudinal force experienced at said second end;

calculating a real portion $k_R$ of extensional wave number k according to the formula $$k_R = \frac{1}{2L} \operatorname{Arccos}(s) + \frac{n\pi}{2L}$$

when n is even, and according to the formula $$k_R = \frac{1}{2L} \operatorname{Arccos}(-s) + \frac{n\pi}{2L}$$

when n is odd, wherein Arccos designates the principal value of the inverse cosine function, s is a cosine function defined according to the formula $$s = \phi_R{}^2 + \phi_I{}^2 - \sqrt{(\phi_R{}^2 + \phi_I{}^2)^2 - (2\phi_R{}^2 - 2\phi_I{}^2 - 1)}$$

where $\phi_R$ is the real portion and $\phi_I$ is the imaginary portion of a relationship $\phi$ defined as $$\phi = \phi_R + i\phi_I = \frac{R_2 R_1 + 1}{R_2 + R_1},$$

and where n is 0 at zero frequency and n is a non-negative integer incremented by 1 each time said cosine function s passes through $\pi$ radians;

calculating an imaginary portion $k_I$ of said extensional wave number k according to the formula $$k_I = \frac{1}{L} \log_e \left[ \frac{\phi_R}{\cos(k_R L)} - \frac{\phi_I}{\sin(k_R L)} \right];$$

and calculating said axial modulus E according to the formula $$E = \frac{\rho \omega^2}{(k_R + ik_I)^2}.$$

6. A method according to claim 5 wherein said length L is selected to be at least ten times said lateral dimension.

7. A method according to claim 5 further comprising the steps of:

coupling a mass to said second end; and applying tension to said second end through said mass during said step of shaking.

* * * * *